(12) United States Patent
Bemont

(10) Patent No.: US 7,492,716 B1
(45) Date of Patent: Feb. 17, 2009

(54) METHOD FOR EFFICIENTLY RETRIEVING TOPOLOGY-SPECIFIC DATA FOR POINT-TO-POINT NETWORKS

(75) Inventor: James Wesley Bemont, Austin, TX (US)

(73) Assignee: Sanmina-SCI, San Jose, CA (US)

( * ) Notice: Subject to any disclaimer, the term of this patent is extended or adjusted under 35 U.S.C. 154(b) by 588 days.

(21) Appl. No.: 11/258,782

(22) Filed: Oct. 26, 2005

(51) Int. Cl.
*H04L 12/28* (2006.01)

(52) U.S. Cl. .................. 370/238; 370/255; 370/395.31; 370/408

(58) Field of Classification Search .................. 370/256, 370/395.31
See application file for complete search history.

(56) References Cited

U.S. PATENT DOCUMENTS

| 5,093,824 A * | 3/1992 | Coan et al. .................. 370/228 |
| 2005/0015511 A1* | 1/2005 | Izmailov et al. ............. 709/238 |

\* cited by examiner

*Primary Examiner*—Chirag G Shah
*Assistant Examiner*—Daniel Mitchell
(74) *Attorney, Agent, or Firm*—Eppa Hite

(57) ABSTRACT

Network topology codes are computed and used as keys to retrieve topology-specific information for isomorphic networks.

13 Claims, 5 Drawing Sheets d|fbc|e|a

| a|bce|df | b|adf|ce | c|ade|b|f | d|bcf|a|e | e|acf|b|d | f|bde|a|c |
|---|---|---|---|---|---|
| a|bce|fd | b|adf|ec | c|aed|b|f | d|bfc|a|e | e|afc|b|d | f|bed|a|c |
| a|bec|df | b|afd|ce | c|dae|bf | d|cbf|ae | e|caf|d|b | f|dbe|c|a |
| a|bec|fd | b|afd|ec | c|dae|fb | d|cbf|ea | e|cfa|d|b | f|deb|c|a |
| a|cbe|d|f | b|daf|c|e | c|dea|bf | d|cfb|ae | e|fac|bd | f|ebd|ac |
| a|ceb|d|f | b|dfa|c|e | c|dea|fb | d|cfb|ea | e|fac|db | f|ebd|ca |
| a|ebc|f|d | b|fad|e|c | c|ead|f|b | d|fbc|e|a | e|fca|bd | f|edb|ac |
| a|ecb|f|d | b|fda|e|c | c|eda|f|b | d|fcb|e|a | e|fca|db | f|edb|ca | d|fbc|e|a d|cbf|ae a|ceb|d|f e|cfa|d|b

|   | a | c | e | b | d | f |
|---|---|---|---|---|---|---|
| a |   |   |   |   |   |   |
| c | 1 |   |   |   |   |   |
| e | 1 | 1 |   |   |   |   |
| b | 1 | 0 | 0 |   |   |   |
| d | 0 | 1 | 0 | 1 |   |   |
| f | 0 | 0 | 1 | 1 | 1 |   |

FIG. 5m

|   | e | c | f | a | d | b |
|---|---|---|---|---|---|---|
| e |   |   |   |   |   |   |
| c | 1 |   |   |   |   |   |
| f | 1 | 0 |   |   |   |   |
| a | 1 | 1 | 0 |   |   |   |
| d | 0 | 1 | 1 | 0 |   |   |
| b | 0 | 0 | 1 | 1 | 1 |   |

FIG. 6m

METHOD FOR EFFICIENTLY RETRIEVING TOPOLOGY-SPECIFIC DATA FOR POINT-TO-POINT NETWORKS

BACKGROUND OF THE INVENTION

1. Field of the Invention

The present invention relates generally to providing topology-specific information, and more particularly to identifying and using topology codes to store and retrieve pre-computed topology-specific information for a point-to-point network.

2. Discussion of Prior Art

Operation of certain networks requires routing tables. Conventionally, routing tables have been recalculated whenever a network topology was changed. If the number of nodes in the network is very small, then the optimal routing matrix could be computed directly by analyzing every possible routing matrix, eliminating those that are invalid or that would allow deadlocks to occur, and choosing the one with the best statistics (such as minimum hop count or shortest longest path). Optimal message routing matrices for even relatively small point-to-point networks may take hours or more to compute using modern computing equipment.

However, if the number of nodes in a simple graph topology exceeds typically 6 nodes, an exhaustive search would become prohibitively time-consuming. A typical 8-node configuration would require analysis of almost 2 quadrillion matrices. This makes on-demand calculation of routing matrices infeasible in environments where users may change a topology and request a routing matrix for the new topology at will. One approach to solving this problem is to artificially restrict the user to pick a network topology from a small set of several allowed topologies, for which the routing tables are already known/computed. Another approach would be to use faster heuristic rules to compute the routing tables upon request. This might reduce the time required to compute the solution, but such heuristic rules might apply only to a small set of simple topologies, and would not guarantee an optimal solution.

It remains therefore difficult and prohibitively time-consuming to calculate some topology-specific information and hence there is a need for a method of more promptly providing topology-specific information for large point-to-point networks.

SUMMARY OF THE INVENTION

The present invention provides a method, given a graph describing the connections between communicating entities, to quickly calculate a topology code that can be used as a key to efficiently look up pre-computed message routing matrices or other topology-specific information. The invention also provides a method for determining whether two given graphs are isomorphic.

The invention computes a topology code for a point-to-point network by ordering the nodes of the graph representing the network in such a way that an adjacency matrix representation of the graph, when encoded into a topology code, yields a maximum value.

Among the advantages of the invention is that it provides a means to quickly retrieve any sort of pre-computed topology-specific information, thereby circumventing the run-time cost that would be incurred were the information computed on demand.

These and other advantages of the invention will become apparent to those skilled in the art upon reading the following detailed description of the preferred embodiment as shown in the several figures of the drawing.

BRIEF DESCRIPTION OF THE DRAWING

FIG. 5m is an adjacency matrix for the network of FIG. 2, using the node ordering specified by the BFS tree traversal of FIG. 5t;

FIG. 6m is an adjacency matrix for the network of FIG. 2, using the node ordering specified by the BFS tree traversal of FIG. 6t.

DETAILED DESCRIPTION OF THE INVENTION

The present invention enables promptly providing topology-specific information for large point-to-point networks. It is assumed that such information has been pre-computed and stored in association with a topology code in such a way as to allow the information to be retrieved by supplying an identical topology code as a key (e.g., in an STL map or a hash table). For each selected network and each newly encountered network the invention calculates a topology code that uniquely identifies the topology of that network. If two graphs have identical topology codes, then they have the same topology and are isomorphic. For instance, although not readily apparent from the drawings, the FIG. 1a and FIG. 1b graphs have the same topology. The FIGS. 1a and 1b graphs can be reconciled by swapping label pairs (4,5) and (6,7) and redrawing either graph. Since the graphs have the same topology, they are isomorphic and have the same topology code.

Topology codes computed for newly encountered networks are used as keys to look up and retrieve stored topology-specific information. Examples of topology-specific information are performance statistics and other data that might be prohibitive to calculate on demand or that accumulate over time. In general, topology codes can be used as keys to look up any sort of stored topology-specific data.

An important example of topology-specific information is an optimal routing matrix describing how to most efficiently route messages between two nodes in a point-to-point network. Because all networks having the same topology implicitly have identical optimal routing matrices except for possible node labeling differences, the optimal routing matrix for a selected topology can be pre-computed and cached. The invention enables providing routing matrices for topologies of 8 nodes and more which require hours or longer to complete, by pre-computing the matrices, storing them in association with their topology codes, and looking them up based on runtime-computed topology codes. Then, if a network's topology is changed (say, by adding another node), its topology code can be quickly recalculated and used as a key to look up the cached optimal routing matrix for the new topology (assuming an optimal routing matrix for the new topology has been pre-computed and stored in the cache).

Figure 4A:
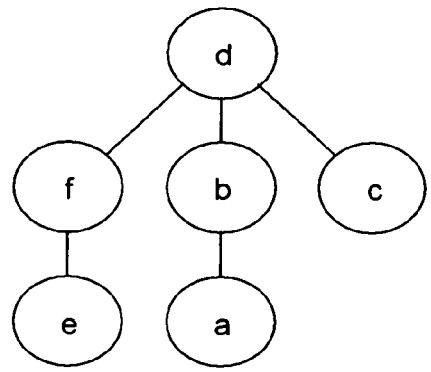
FIGS. 4a and 4b graphically represent trees of the two BFS traversals listed in FIG. 3 column 4 row 7 and row 3, respectively.
Figure 4B:
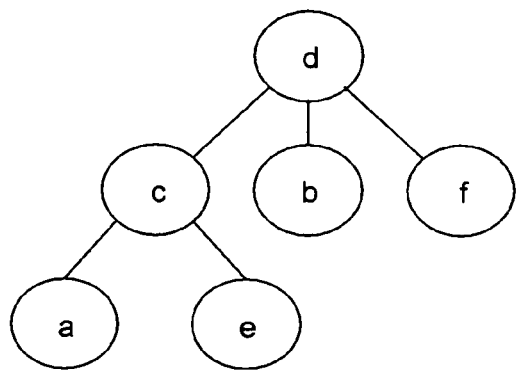
Figure 5T:
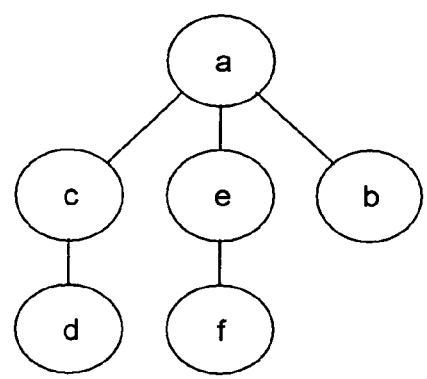
FIG. 5t is a tree graphic representation of the BFS traversal "a|ceb|d|f" listed in FIG. 3 column 1 row 6.
Figure 6T:
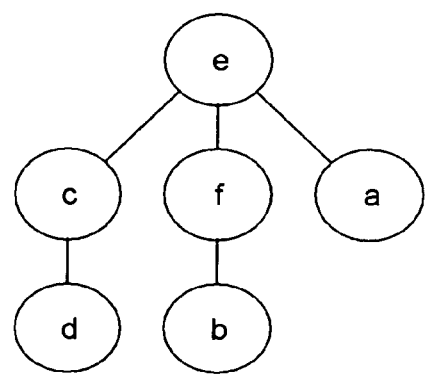
FIG. 6t is a tree graphic representation of the BFS traversal "e|cfa|d|b" listed in FIG. 3 column 5 row 4.

The invention first applies a node ordering algorithm to the graph representing the network. Any algorithm may be employed that visits each node exactly once, and that is guaranteed to produce the same set of orderings for isomorphic graphs. Because the computed topology code is affected by the choice of node ordering algorithm, the algorithm employed when computing a topology code key used to look up stored topology-specific data must be the same algorithm that was employed to generate the topology code key associated with the stored data. The examples in the remainder of this document use a breadth first search (BFS) algorithm with the additional step of considering all possible orderings of child nodes. Typically in BFS traversals, one is interested in visiting all nodes and visiting parent nodes before child nodes, but is not interested in the order in which the child nodes are visited. In contrast, the present invention is interested in the order of child node visits because this can affect the topology code value. The chosen node ordering algorithm considers all possible BFS traversal orderings. The FIG. 2 graph represents a 6-node network for which a topology code will be computed. The chosen node ordering algorithm yields the BFS traversals of trees listed in the FIG. 3 table. In each traversal, the root node appears first and groups of nodes having the same parent node are separated by '|'. FIGS. 4a and 4b show two BFS trees having their root at node "d" and traversing the FIG. 2 network as in FIG. 3 column 4 row 7 and row 3 respectively. FIG. 5t is the BFS tree for the FIG. 3 column 1 row 6 traversal, and FIG. 6t is the BFS tree for the FIG. 3 column 5 row 4 traversal.

Figure 7:
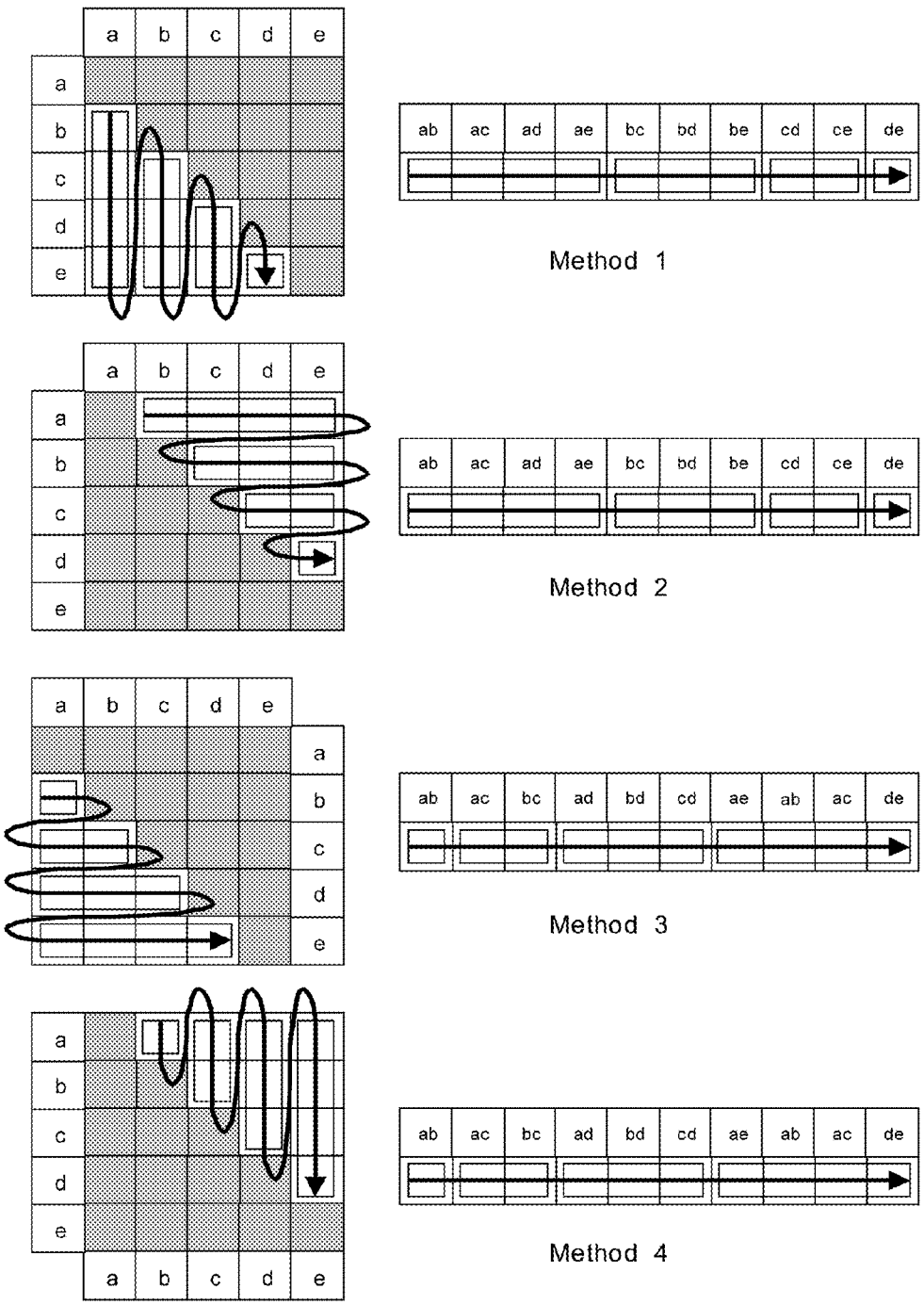
FIG. 7 shows schemes to derive a topology code from an adjacency matrix.

A topology code is computed from a node ordering by first using the given ordering to construct an adjacency matrix representation of the graph. The elements of the adjacency matrix have a value of 1 if the vertices indicated by the intersecting column and row are directly connected neighbors in the graph representing the network, or 0 otherwise. Because the values of the elements of an adjacency matrix for simple undirected graphs are mirrored about the matrix's diagonal, more than half the elements are redundant and can be ignored. The remaining elements are mapped to bits in the topology code. FIG. 7 shows four ways to map adjacency matrix elements to topology code bits. As can be seen from FIG. 7, methods 1 and 2 are equivalent, as are methods 3 and 4. To facilitate early determination that a candidate topology code's value is less than the value of the current maximum candidate topology code and can therefore be discarded, the bits in the candidate topology codes are filled in from most significant bit to least significant bit. This is indicated by the direction of the arrows in FIG. 7. Because the computed topology code is affected by the choice of bit ordering scheme, the scheme employed when computing a topology code key used to look up stored topology-specific data must be the same scheme that was employed to generate the topology code key associated with the stored data. The following examples use the row-major topology code bit ordering scheme considering the lower-left adjacency matrix values (method 3 in FIG. 7). Using this scheme, the FIG. 5t node ordering gives the adjacency matrix shown in FIG. 5m and the FIG. 6t node ordering gives the adjacency matrix shown in FIG. 6m.

The candidate topology code associated with FIG. 5m is ("b'" for binary) 0b'111 1000 1010 0111 (or in hexadecimal 0x78A7). The candidate topology code associated with FIG. 6m is 0b'110 1100 1100 0111 (or in hexadecimal 0x6CC7). The candidate topology code with the maximum binary numerical value is taken to be the topology code representing the graph, and the node ordering used represents a canonical labeling for the graph.

Figures 2, 3:
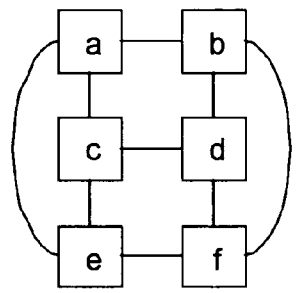
FIG. 2 shows an example point-to-point network.
FIG. 3 lists all possible orderings of nodes in BFS traversals of the FIG. 2 network.

In a process of evaluating traversals from FIG. 3 starting down column 1, the row 6 traversal, as represented in the FIG. 5t tree, gives the node ordering for the FIG. 5m matrix to produce a new candidate maximum value topology code of b'111 1000 1010 0111, or in hexadecimal 0x78A7, which will at least temporarily be considered the topology code for the FIG. 2 network.

After finding the FIG. 5m candidate maximum value topology code, continuing the search will ultimately find 11 other BFS trees yielding the same maximum topology code, but none higher. In the simple example network of FIG. 2, every node being connected to exactly three others reduces the test for producing the maximum code to: a traversal in which the first and second nodes connected to the root are also connected to each other. Each node has two such tree traversals, for a total of 12 out of the 48 possible traversals from FIG. 3. The FIG. 4a traversal is among those yielding the maximum code.

Figure 1A:
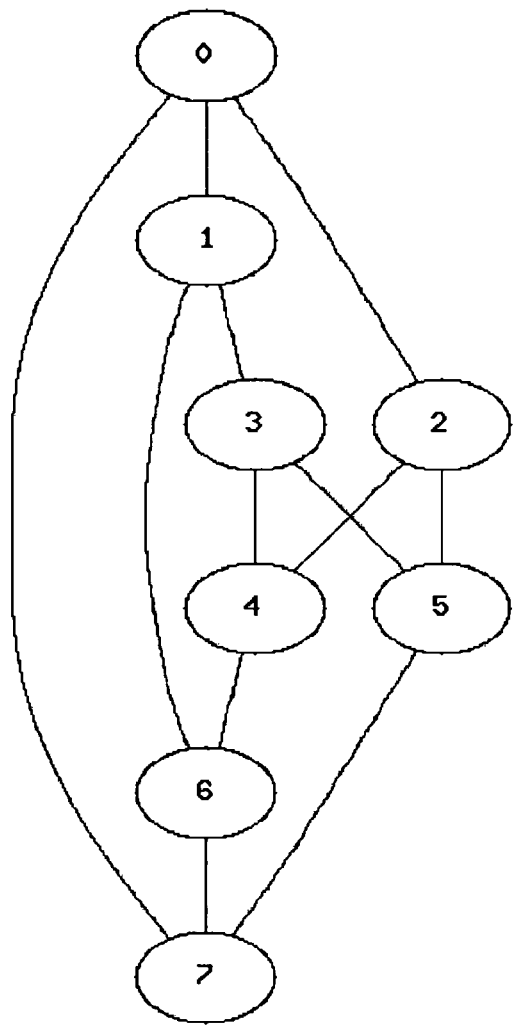
FIGS. 1a and 1b show two apparently dissimilar yet isomorphic graphs.
Figure 1B:
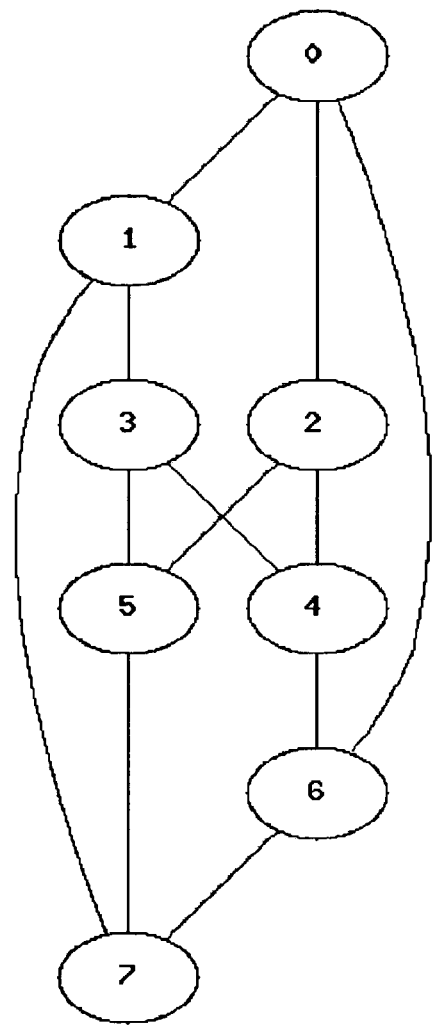

The topology code for both the FIGS. 1a and 1b graphs is 0x0D19448D using the chosen node ordering algorithm and bit mapping scheme.

A preferred embodiment of the invention combines these steps for efficiency. For example, adjacency matrices can be filled in as the node orderings are generated, and the maximum candidate topology code computed so far can be remembered. If the matrix that produced the current maximum candidate topology code has a connection between a pair of vertices but the node ordering currently being used to fill in a candidate matrix has no connection between that pair of vertices, then, since the adjacency matrix is filled in order of bits from most significant to least significant, it immediately becomes evident that the currently-filling matrix can only produce a non-maximal topology code. For example, once the FIG. 5m current maximum code has been calculated, then upon processing the FIG. 6m matrix to the third bit, row f column c where FIG. 5m has a 1 value, FIG. 6m having a 0 value dooms it to produce a less-than-maximum value. If this situation were encountered, computation with the node ordering currently filling the doomed matrix would better be abandoned and the algorithm should move on to the next node ordering. This eliminates a large number of calculations and vastly improves efficiency.

A topology code constructed in this manner contains all information necessary to reconstruct a graph that is isomorphic to all other graphs having the same topology code. The most significant bit of the topology code will always have a value of 1. The redundancy in an adjacency matrix representation of a graph indicates that the number of nodes N in the graph is related to the number of significant bits B in the topology code by the following formula: $B=N(N-1)/2$. Once the number of nodes N are known, an N×N adjacency matrix can be populated directly with the bit values of the topology code according to the bit mapping scheme used to create the topology code. A graph can then be drawn from inspection of the adjacency matrix.

If stored topology-specific data is dependent on node ordering, then its node ordering should be stored and retrieved along with the data itself. For example, a routing table for a specific network would contain references to nodes within the network. When a topology code is computed for a new network that is isomorphic to the stored network, the new network's node labeling may be different from the stored network. Having access to the stored network's node ordering allows the stored routing table's node references to be mapped to the node labeling of the new network.

The invention can be used to retrieve any sort of topology-specific information given any network whose topology can be described by a simple graph. While the preferred embodiment is directed specifically to simple graphs (having at most a single edge connecting any two vertices), the ideas apply equally well to graphs where there may be multiple edges (or equivalently, single edges with weight values) connecting vertices. The difference would be that the adjacency matrices would contain values other than just 0 or 1, and these numbers would map to more than one bit in the topology code.

While the present invention is described in terms of a preferred embodiment, it will be appreciated by those skilled in the art that this embodiment may be modified without departing from the essence of the invention. It is therefore intended that the following claims be interpreted as covering any modifications falling within the true spirit and scope of the invention.

I claim:

1. In a computer a method of providing topology-specific data for a given point-to-point network, comprising the steps of:
 pre-computing and making available topology-specific data for a plurality of point-to-point networks by a computer;
 calculating and making available a respective unique topology code for each of the plurality of networks by a computer;
 calculating a topology code by a computer for the given network;
 using the calculated topology code for the given network by a computer as a key to look up the pre-computed topology-specific data for networks having the same topology code; and
 retrieving the pre-computed topology-specific data for the given network,
wherein candidate topology codes are calculated by evaluating a graph of each network and using the evaluations to populate an adjacency matrix.

2. The method of claim 1 wherein topology codes are compiled by mapping adjacency matrix elements to bits into the topology codes.

3. The method of claim 2 wherein only the portion of the adjacency matrix on one side of a diagonal is populated.

4. The method of claim 1 wherein the evaluation is a Breadth-First-Search (BFS) of a tree representation of the graph.

5. The method of claim 4 wherein traversals of all possible BFS tree representations of the graph are considered in calculating candidate topology codes.

6. The method of claim 5 wherein the candidate topology code with the maximum value is taken to be the topology code representing the graph.

7. The method of claim 6 wherein if the latest-computed digit of a candidate topology code gives the string a lower value than the same length string of a previously computed candidate code, the calculation of the current candidate code is aborted.

8. The method of claim 6 wherein the node ordering which first specified the label ordering used to generate the topology code represents a canonical labeling for the graph.

9. The method of claim 1 wherein the evaluation is a Depth-First-Search (DFS) of a tree representation of the graph.

10. The method of claim 9 wherein traversals of all possible DFS tree representations of the graph are considered in calculating candidate topology codes.

11. The method of claim 10 wherein the candidate topology code with the maximum value is taken to be the topology code representing the graph.

12. The method of claim 11 wherein if the latest-computed digit of a candidate topology code gives the string a lower value than the same length string of a previously computed candidate code, the calculation of the current candidate code is aborted.

13. The method of claim 11 wherein the DFS tree which first specified the label ordering used to generate the topology code represents a canonical labeling for the graph.

* * * * *